Dec. 9, 1952   O. W. BOUGHTON   2,620,565
MOUNT FOR TELESCOPE GUN SIGHTS
Filed Sept. 29, 1951
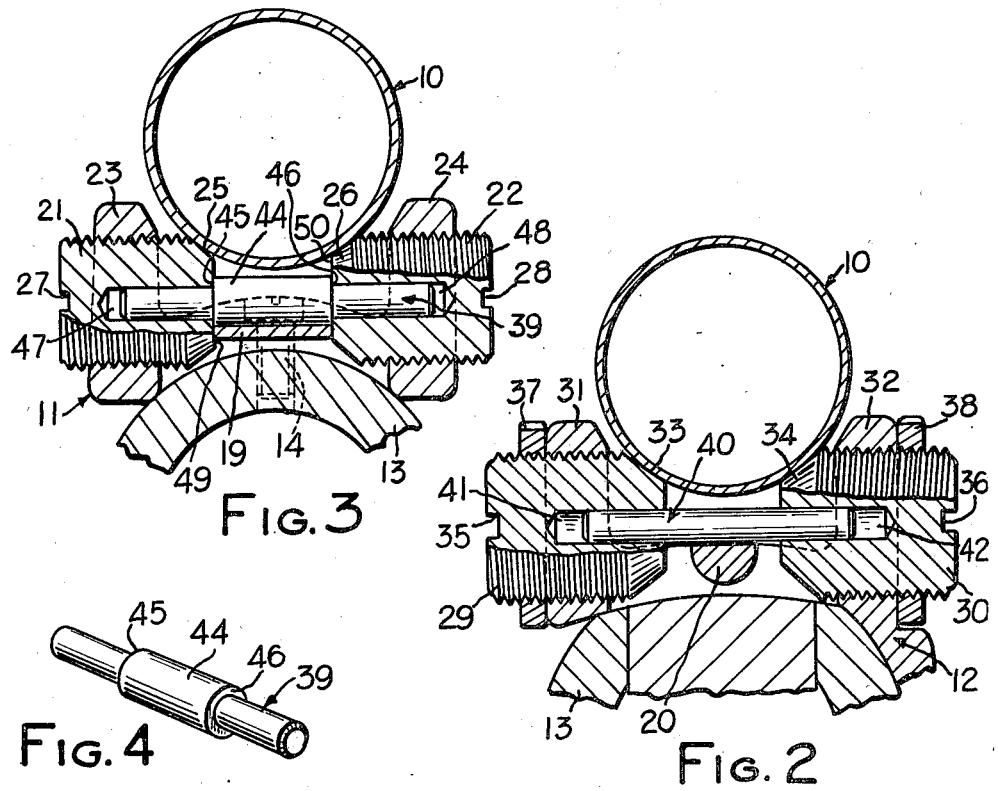
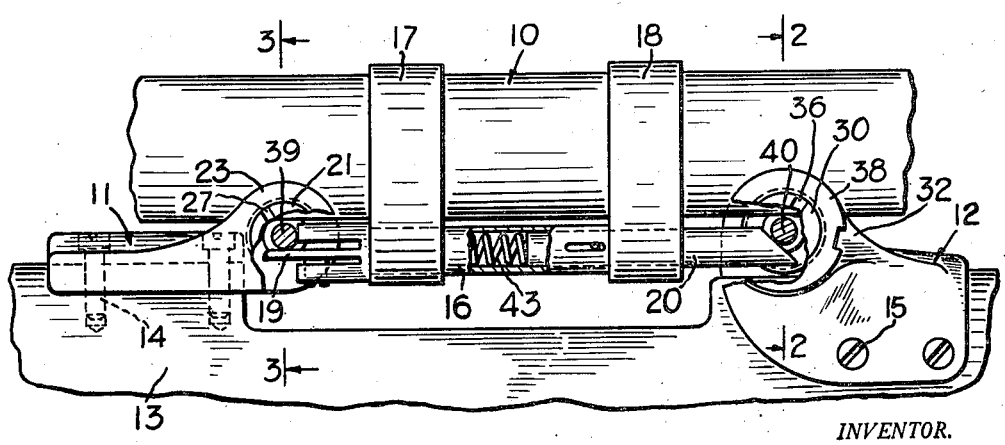
INVENTOR.
OLIN W. BOUGHTON
BY
ATTORNEY Patented Dec. 9, 1952

2,620,565

UNITED STATES PATENT OFFICE 2,620,565

MOUNT FOR TELESCOPE GUN SIGHTS

Olin W. Boughton, Victor, N. Y., assignor to Bausch & Lomb Optical Company, Rochester, N. Y., a corporation of New York Application September 29, 1951, Serial No. 248,944

3 Claims. (Cl. 33—50)

This invention relates to telescope gun sights and more particularly to means for mounting and effecting sighting adjustments of such sights.

It is an object of this invention to provide a novel gun telescope mounting which is simple and rugged in structure and of low-cost construction while being reliable and accurate in operation.

Another object is to provide such a device having means for facilitating rapid resetting and locking of its adjusting parts.

Further objects and advantages reside in the novel details of construction and combination of parts as described hereinafter in the specification and shown in the accompanying drawing in which:

Fig. 1 is a side elevation of a gun telescope mounting incorporating my invention, certain parts being broken away and shown in section, Fig. 2 is an enlarged sectional view taken on the line 2—2 of Fig. 1 of one form of my invention with parts in elevation, Fig. 3 is a view taken on the line 3—3 of Fig. 1, and Fig. 4 is an enlarged perspective view of a part of the device shown in Fig. 3.

The mechanism herebelow disclosed is related generally to the gun telescope mounting and clamping mechanism shown and described in patent application Serial No. 87,234 of Donald T. Street, filed April 13, 1949.

With reference to Fig. 1, a gun sighting telescope 10 is shown fragmentarily in operating position on front and rear mounting brackets 11 and 12, respectively, said brackets being fixed to a gun barrel 13 by cap screws 14 and 15, respectively. The telescope 10 is secured on brackets 11 and 12 by a clamping mechanism comprising a bar 16 which is held on said telescope by a pair of encircling bands 17 and 18. At the front end of the bar 16, a resilient tongue 19 projects into engagement with a part held by bracket 11, and at the rear end thereof a spring-pressed plunger 20 is provided for engagement with a part held by the rear bracket 12, as hereinafter described, to demountably clamp the telescope onto said brackets.

A somewhat V-shaped seat is provided for the front of the telescope 10, as shown in Fig. 3, comprising a pair of screw members 21 and 22 which are threaded in axial alignment with each other laterally through the opposite sides 23 and 24 of front bracket 11. At the adjacent inner ends of screw members 21 and 22, are formed frusto-conical or tapered surfaces 25 and 26 which cooperatively provide the V-shaped seat for the front part of the telescope 10. Windage or lateral adjustments of the telescope are made by equal axial movements of screw members 21 and 22 and transverse slots 27 and 28 are provided in the outer ends thereof for this purpose wherein a suitable instrument may be inserted to rotate the members.

In the rear bracket 12, another pair of screw members 29 and 30, similar to members 21 and 22, are laterally threaded through the opposite sides 31 and 32 thereof. A V-shaped seat for the rear part of telescope 10 is provided by a pair of frusto-conical surfaces 33 and 34 formed on the adjacent inner ends of screw members 29 and 30. Transverse slots 35 and 36 are formed in the outer ends of screw members 29 and 30, respectively, for adjusting their axial positions in the bracket 12, toward and away from each other to control the elevational or vertical position of the telescope. For locking members 29 and 30 in proper adjustment, a pair of lock nuts 37 and 38 are threaded onto the outer ends thereof so as to lock against the sides 31 and 32 of bracket 12.

According to this invention, means are provided as aforementioned for securing the telescope 10 to the brackets 11 and 12 comprising a pair of cylindrical anchor rods 39 and 40, respectively, held therein. Anchor rod 40 is mounted at its ends for free relative rotational and axial movement in a pair of axial bores 41 and 42 formed centrally in the inner ends of the screw members 29 and 30, respectively, so as to bridge the space between the screw members. Beneath this anchor rod 40 there is held in locking position the inclined end of clamping plunger 20, as shown in Fig. 1. The force transmitted by a plunger spring 43 is sufficient to hold the telescope 10 yieldingly and reliably on the seating surfaces 33 and 34. Excess depth of the axial bores 41 and 42 is provided at the ends of rod 40 to allow a great range of axial movement when elevational adjustments are made on the sighting position of the telescope 10.

As shown in Figs. 3 and 4, the front anchor rod 39 is differently constructed than anchor rod 40 and serves an additional purpose when used with the windage adjustment members 21 and 22. Anchor rod 39 is provided with an enlarged center portion 44, terminating at its sides in a pair of radial shoulders 45 and 46, which act as stops for the inner ends of the screw members 21 and 22 and serve to keep them spaced apart a definite distance when making windage adjustments. The outer ends of anchor rod 39 are freely mounted to slide and rotate in the respective bores 47 and 48 formed in the inner ends of screw members 21 and 22, these bores being somewhat deeper than the length of the small diametered end portions. By the above described means, the elevational position of telescope 10 in the front bracket 11 remains the same for all settings of the windage adjustment mechanism. A further advantage lies in the fact that the radial faces 49 and 50 on the inner ends of members 21 and 22 hold the tongue 19 against lateral movement and so prevent tipping of the telescope 10. Another important function of the shoulders 45 and 46 is to serve as locking means for the screw members 21 and 22 since the enlarged portion 44 may be jammed between the radial faces 49 and 50 when adjusting said members to establish locking friction in the threaded connection between said members and the bracket 11. Consequently, said radial faces must be square with the anchor rods so as to establish a good frictional contact with shoulders 45 and 46.

In operation, windage or lateral adjustments of the telescope 10 are made by loosening either screw member 21 or 22, depending on the direction of the desired adjustment, and then tightening the other screw. Thus, if it is desired to adjust the telescope to the left, as shown in Fig. 3, the screw member 21 is unscrewed or loosened to move it to the left the desired amount. Then the screw member 22 is tightened or screwed inwardly so as to move it to the left until the shoulder 45 on anchor rod 44 is forced against the face 49 on screw member 21. Hence, the screw members 21 and 22 will be locked by having their faces 49 and 50 jammed, respectively, against the shoulders 45 and 46. If it is desired to adjust the telescope 10 vertically for elevation, the lock nuts 37 and 38 are loosened. Then, if the telescope 10 is to be raised, the screw members 29 and 30 are both screwed inwardly and if the telescope 10 is to be lowered the screw members 29 and 30 are screwed outwardly so that the space between them is increased. The lock nuts 37 and 38 are then tightened. Each of the screw members 21, 22, 29 and 30 is, of course, separately and independently rotatable since the anchor rods 39 and 40 do not transmit rotary motion from one screw member to another.

From the foregoing description, it will be perceived that the sighting adjustments may be performed on the telescope 10 without disturbing the effectiveness of the clamping mechanism in any way. Furthermore, this invention provides a very simple, effective and inexpensive mounting for a sighting telescope in conformity with the stated objects of this invention. It is obvious that this invention may be modified and constructed in forms other than the described preferred form and changes and substitutions may be made in the details of construction and arrangement of parts without departing from the spirit of this invention as defined in the claims appended below.

I claim:

1. In a gun telescope mounting having a bracket fixed to a gun barrel, yielding attaching means including a clamping member on a telescope by which it is held on the bracket so as to permit adjustments thereof in vertical and horizontal planes, and a pair of axially aligned screw members threaded into opposite sides of said bracket and provided at their adjacent ends with tapered surfaces which cooperatively form a seat for said telescope, the combination of a cylindrical anchor rod extending between the screw members, the clamping member being in clamping engagement with the rod, said rod being freely mounted for rotational and longitudinal motion in central bores in said screw members whereby said rod functions solely as an anchor means for said telescope.

2. In a gun telescope mounting having a bracket fixed to a gun barrel, yielding attaching means including a clamping member on a telescope by which it is held on the bracket so as to permit adjustments thereof in vertical and horizontal planes, and a pair of axially aligned screw members threaded into opposite sides of said bracket and provided at their adjacent ends with frusto-conical surfaces which cooperatively form a seat for said telescope, the combination of a cylindrical anchor rod extending between the screw members, said rod having its opposite ends mounted for free rotational and longitudinal movements in respective bores which are located in the adjacent ends of said screw members, said rod having a pair of radial shoulders located a fixed distance from each other whereon the adjacent ends of said screw members may bear when making windage adjustments to said telescope without affecting its elevational adjustment.

3. In a gun telescope mounting having a bracket fixed to a gun barrel, yielding attaching means including a clamping member on a telescope by which it is held on the bracket so as to permit adjustments thereof in vertical and horizontal planes and a pair of axially aligned screw members threaded into opposite sides of said bracket and provided at their adjacent ends with frusto-conical surfaces which cooperatively form a seat for said telescope, the combination of a cylindrical anchor member which is rotatably and slidably fitted at its ends into corresponding bores in said adjacent ends of the screw members, said rod having a pair of peripheral radial shoulders located a fixed distance from each other, said adjacent ends terminating in plane radial friction surfaces extending at least over the areas contacted by said radial shoulders whereby forcible engagement of these surfaces against the shoulders provides sufficient excess friction in the threaded connection between said members and the bracket to lock said members securely against rotation.

OLIN W. BOUGHTON.

No references cited.